(12) United States Patent
Challener

(10) Patent No.: US 7,676,430 B2
(45) Date of Patent: Mar. 9, 2010

(54) SYSTEM AND METHOD FOR INSTALLING A REMOTE CREDIT CARD AUTHORIZATION ON A SYSTEM WITH A TCPA COMPLAINT CHIPSET

(75) Inventor: David Carroll Challener, Raleigh, NC (US)

(73) Assignee: Lenovo (Singapore) Ptd. Ltd., Singapore (SG)

( * ) Notice: Subject to any disclaimer, the term of this patent is extended or adjusted under 35 U.S.C. 154(b) by 3189 days.

(21) Appl. No.: 09/851,956

(22) Filed: May 9, 2001

(65) Prior Publication Data
US 2002/0169717 A1 Nov. 14, 2002

(51) Int. Cl.
*G06Q 30/00* (2006.01)
(52) U.S. Cl. .................... 705/39; 705/26; 705/27; 705/37; 705/38; 705/40; 705/41; 713/185; 713/187
(58) Field of Classification Search .......... 705/26, 705/27, 37, 38, 39, 40, 41; 713/185, 187
See application file for complete search history.

(56) References Cited

U.S. PATENT DOCUMENTS

| | | | | |
|---|---|---|---|---|
| 5,982,898 A | 11/1999 | Hsu et al. | | 380/23 |
| 5,991,399 A | 11/1999 | Graunke et al. | | 380/4 |
| 6,061,791 A | 5/2000 | Moreau | | 713/171 |
| 6,105,006 A | 8/2000 | Davis et al. | | 705/35 |
| 6,105,131 A | 8/2000 | Carroll | | 713/155 |
| 6,389,537 B1 * | 5/2002 | Davis et al. | | 713/187 |
| 6,820,202 B1 * | 11/2004 | Wheeler et al. | | 713/185 |

OTHER PUBLICATIONS

"TCPA," *Trusted Computing Platform Alliance*, 1999-2000, Via Internet http://www.trustedpc.org/home/home.htm, p. 1.
"Trusted Computing Platform Alliance (TCPA)," *Main Specification Version 1.0*, Jan. 25, 2001, pp. 1-284.
"Trusted Computing Platform Alliance(TCPA)," *TCPA Design Philosophies and Concepts Version 1.0*, Jan. 25, 2001, pp. 1-30.

* cited by examiner

*Primary Examiner*—Nga B. Nguyen
(74) *Attorney, Agent, or Firm*—Winstead P.C.

(57) ABSTRACT

The Trusted Computing Platform Alliance (TCPA) Specification is implemented to allow a credit card company to remotely install a credit card private key into a TCPA module to create a Trusted Platform Module (TPM). More specifically, when a credit worthy user applies for a credit card, the user will send the credit card company a public portion of a "non-migratable storage key," which is accredited a TPM endorsed by a Certification Authority. The credit card company will create its own public/private key pair according to the TCPA Specification, to create a TCPA header, and wrap the full structure by encrypting it with the public portion of the TCPA non-migratable storage key. The credit card company then sends by email the encrypted bundle with a certificate for it, and sends a corresponding pass phrase by regular mail.

27 Claims, 3 Drawing Sheets

SYSTEM AND METHOD FOR INSTALLING A REMOTE CREDIT CARD AUTHORIZATION ON A SYSTEM WITH A TCPA COMPLAINT CHIPSET

TECHNICAL FIELD

The present invention relates in general to data processing systems, and in particular, to enabling secure communications over data processing networks.

BACKGROUND INFORMATION

The Internet provides a new arena for electronic commerce in which credit card companies are very interested. Quite naturally, since "commerce" is a necessary part of e-commerce, it stands to note that providing for the transfer of funds and credit during e-commerce transactions bodes well for those credit card companies that can securely provide for such transactions. One of the main concerns that continues with respect to e-commerce is the lack of trust that the consuming public has in the security of such transactions to protect their credit card and banking accounts.

One current method for obtaining a credit card from a credit card company on-line is for the user to fill out a credit card application at the credit card company's website, and then if approved, the credit card company will send a physical credit card to the user who can then activate the credit card by calling a toll-free number from the user's home phone. However, credit card theft is abundant, and according to some reports, accounts for half of the monetary loss of the credit card companies.

To eliminate the need for a physical credit card, another prior art method is to send to the user a smartcard for use in on-line transactions. However, the problem with a smartcard is one of expense, since use of a smartcard requires a smartcard reader to be installed on the user's computer.

As a result, there is a need in the art for a less expensive but reliable and secure process for enabling users to obtain a credit card authorization that they can use on their computer for facilitating purchases over the Internet.

SUMMARY OF THE INVENTION

The present invention makes use of the TCPA (Trusted Computing Platform Alliance) Specification to allow a credit card company to remotely install a credit card private key into a TCPA module in a way that the company can be assured it is going to a trusted TPM (Trusted Platform Module). More specifically, when a user applies for a credit card, the credit card company will first determine if the person is credit worthy. Assuming they are, then the user will send the credit card company a public portion of a "non-migratable storage key," which is accredited a TPM which is in turn endorsed by a Certification Authority (CA). The private portion of the "non-migratable storage key" is known to be a key that was created inside the TPM, and cannot be exported from the TPM. The credit card company will now create its own public/private key pair according to the TCPA Specification, using whatever size key it desires, create a TCPA header, and wrap the full structure by encrypting it with the public portion of the TCPA non-migratable storage key. The credit card company will then send by email to the person the encrypted bundle and a certificate for it, and via "snail mail," a pass phrase that is hashed to provide usage of the encrypted bundle on the person's system.

The present invention provides for an interaction between the credit card company and the user in a way so that the credit card company is assured that a private key used by a user is used to the same degree that the user uses a physical credit card. That is, an embodiment of the present invention establishes a similar level of trust for a credit card authorization over the Internet as presently exists for transactions using physical credit cards in stores.

In one alternative embodiment of the present invention, the credit card company can be its own certification authority.

An advantage of the present invention is that only one user computer can use the encrypted bundle sent by the credit card company, which will reduce the amount of fraud by use of credit cards in e-commerce transactions. Another advantage of the present invention is that the certificate can easily be checked against the credit card company's database for revocation. Using this type of signature instead of a credit card number precludes someone from charging a credit card multiple times, and also precludes someone keeping a database of credit card numbers to be exposed to a hacker accessing such numbers.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as encryption methods or key lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Figure 3:
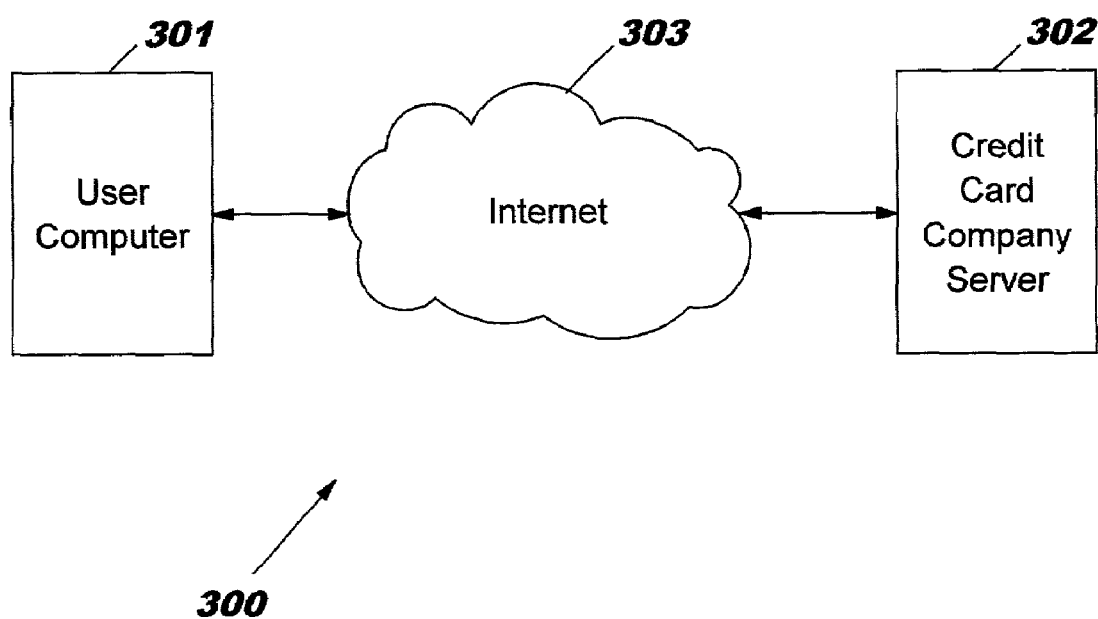
FIG. 3 illustrates a network configured in accordance with the present invention.

Referring to FIG. 3, there is illustrated a configuration of a network 300 in accordance with the present invention where a user (customer) computer 301 applies for a credit card authorization from a credit card company server 302 over the Internet 303.

Figure 1:
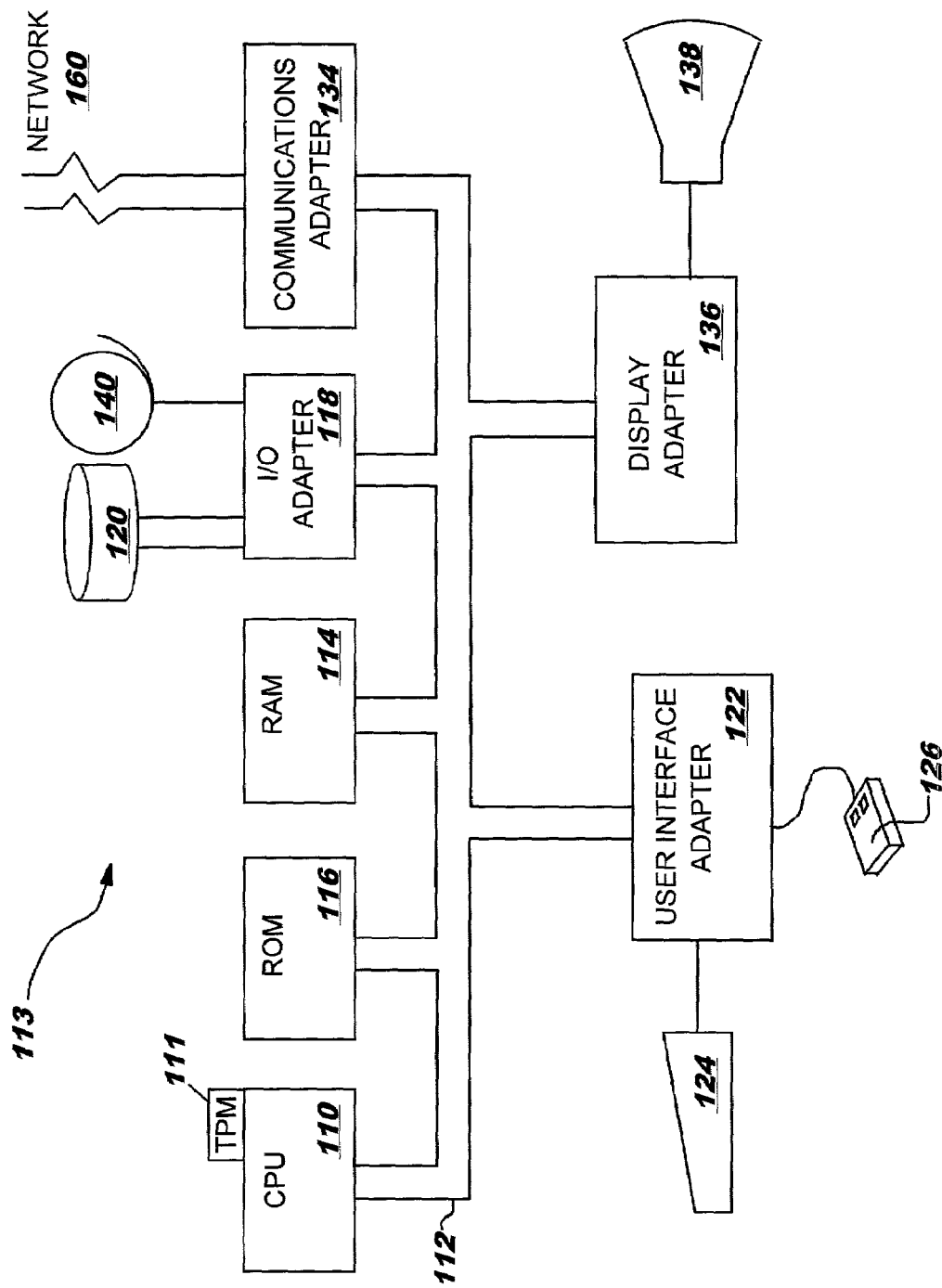
FIG. 1 illustrates a data processing system configured in accordance with the present invention.

Referring to FIG. 1, there is illustrated exemplary data processing system 113 configured in accordance with the present invention, whereby system 113 could be used for the user computer 301, the credit card company server 302, and any and all servers used in the Internet 303 to communicate data between computer 301 and server 302.

The system 113 has a central processing unit (CPU) 110, which is coupled to various other components by system bus 112. Read-only memory ("ROM") 116 is coupled to the system bus 112 and includes a basic input/output system ("BIOS") that controls certain basic functions of the data processing system 113. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network 160 (e.g., the Internet 303) enabling the data processing system to communicate with other such systems. Input/Output devices are also connected to system bus 112 via user interface adapter 122 and display adapter 136. Keyboard 124 and mouse 126 are all interconnected to bus 112 via user interface adapter 122. Display monitor 138 is connected to system bus 112 by display adapter 136. In this manner, a user is capable of inputting to the system 113 throughout the keyboard 124 or mouse 126 and receiving output from the system via display 138.

Implementations of the invention include implementations as a computer system programmed to execute the method or methods described herein, and as a computer program product. According to the computer system implementation, sets of instructions for executing the method or methods may be resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's workstation by a network or by an external network such as the Internet 303. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
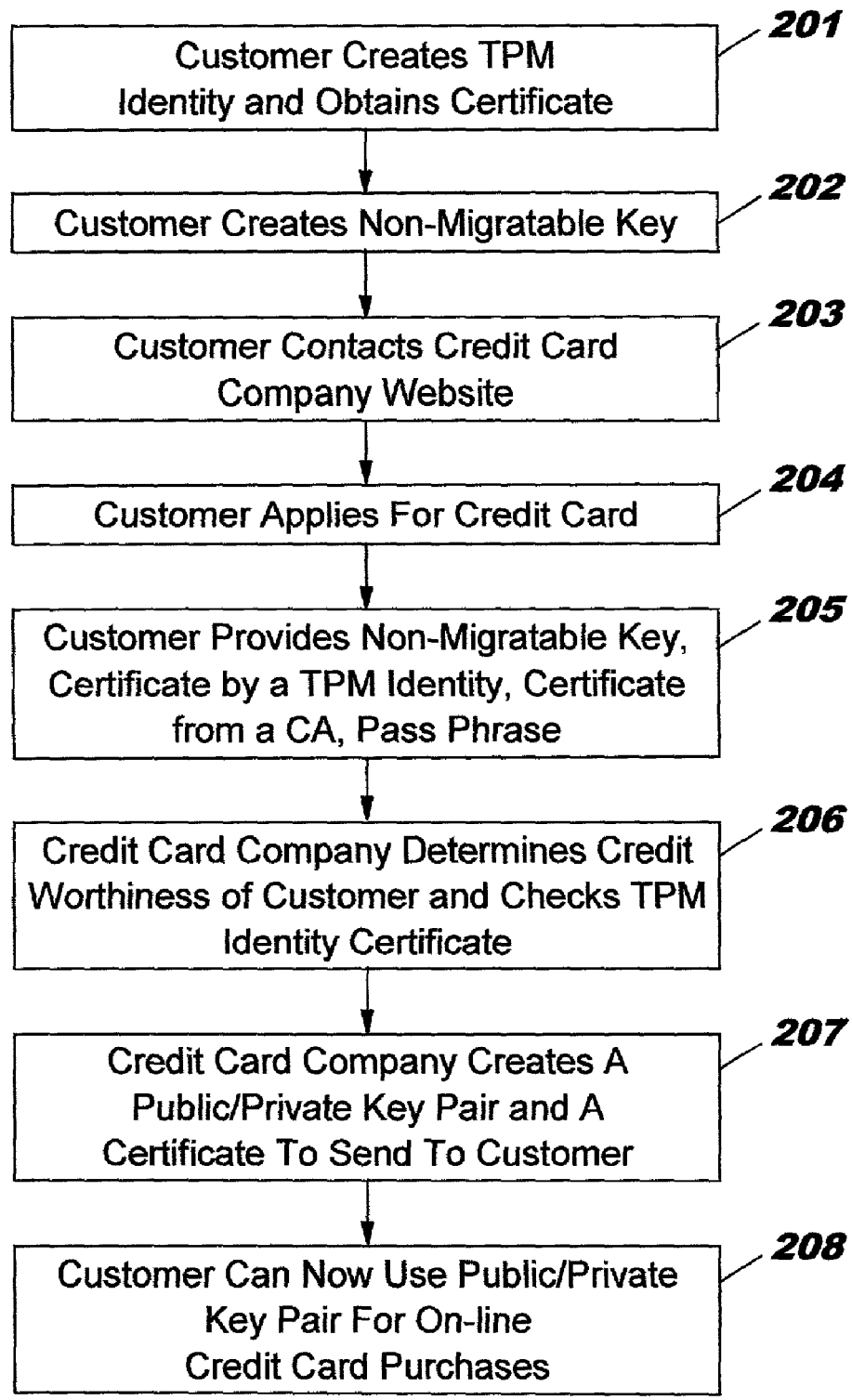
FIG. 2 illustrates a flow diagram configured in accordance with the present invention.

Referring to FIG. 2, there is illustrated a flow diagram of a process configured in accordance with an embodiment of the present invention where a potential credit card customer desires to receive an embedded credit card authorization within the customer's computer system 301. In step 201, the customer will create a TPM identity per the TCPA Specification and obtain a certificate for it. The TCPA Specification is published at www.trustedpc.org/home/home.htm. as Version 1.0, which is hereby incorporated by reference herein. When a TPM is manufactured, its own endorsement key is generated and placed into nonvolatile memory inside the TPM chip. Only the public portion of that endorsement key, P1, is ever released from the chip, and is released to the manufacturer. The manufacturer of the TPM signs a certificate, C1, that goes along with the TPM. Alternatively, the certificate, C1, can be retrieved by a user over the Internet from the manufacturer. This certificate, C1, is tied to the public portion of the endorsement key, P1, that determines that the public key is the endorsement key of this particular TPM. This endorsement key, P1, is used for decrypting.

As noted above, a TPM identity is created in step 201, which is a special kind of private key. A TPM identity can be created by the customer, such as with a DOS command, and the TPM identity is the public portion of a public/private key pair.

The public key, P2, of the TPM identity and the certificate, C1, tied to the public portion of the endorsement key, P1, are then sent over the Internet to a Certificate Authority (CA). This may be authorized by the user as a result of a user command. The CA checks the accuracy of the certificate, C1, signed by the manufacturer. The CA can perform this check by looking in a database at the manufacturer's website. The CA then makes a certificate, C2, for the TPM identity, P2, and encrypts the certificate, C2, and bundles it with the public key, P2, of the TPM identity sent by the customer. This second bundle is then encrypted with the public endorsement key, P1, of the TPM.

The second bundle is then returned to the customer by the CA, which is then decrypted by the TPM with the private portion of the endorsement key, P3. This protects from unauthorized requests for certificates from a CA. The TPM will then decrypt the first bundle with the private key, P4, of its TPM identity to obtain the certificate, C2, issued by the CA. The result is a TPM identity that has been signed by a CA.

In step 202, the customer with create a non-migratable key. The TCPA Specification has two types of keys used to store other keys. The first type is "migratable," and the owner of the system is able to move such keys to other systems, as long as the owner knows the correct authorization data. It is possible to move such keys to insecure systems this way, and hence, migratable keys can be exposed by the owner of the system. This may or may not be a problem to a credit card company. Currently, a consumer exposes his key to a seller every time he shows his credit card, so currently, there is no requirement that keys be kept out of the hands of the customer. "Non-migratable" keys are locked to the hardware in a way that they cannot be cloned or migrated to another system even by the owner. They are thus inherently more secure.

In one alternative embodiment of step 202, the customer creates a non-migratable storage key, K1, that may be a 2048-bit RSA key. A storage key is used for encrypting other keys so that the TPM can read them (i.e., a storage key decrypts items into the TPM). To create a non-migratable storage key, the customer may use the CreateWrapKey function of the TCPA Specification. There may also be a piece of software that does this for the user in a user-friendly way. The customer will then decide if the key, K1, will require authorization or not, and what that authorization would be. When the key is created, the customer decides if he wants to require authorization for use and if so, what pass phrase to use to provide the authorization. Software can be used to require authorization using some other type of means instead of a pass phrase, such as through the use of biometrics. The customer also decides what parent will be used for storing this key (the SRK (storage root key) is available). The parent key is a key used to store another key. The key stored is called a child, while the key used to do the storing is called the parent. In particular, if there are two key pairs, Private One, Public One and Private Two, Public Two, if Private Two is encrypted with Public One, then the first key pair would be referred to as the parent and the second key pair the child. Further, there is one key that is guaranteed to always be loaded inside the chip. It is called the storage root key, and it is an ancestor of every other key the chip can use. To load a key into the chip, it needs to have its parent's private key already loaded in the chip (so the chip can decrypt it). If the SRK is the great grandparent of a key, first one would need to load the grandparent of a key in the chip, then the parent of the key into the chip, and finally the key itself into the chip. This structure, called a daisy chain, is used to allow a TCPM chip to "store" an unlimited number of keys. The customer will then execute a TPM_CreateWrapKey command, with required parameters indicating the key produced will be a storage key. The customer then signs the non-migratable storage key, K1, with the TPM identity key, P2, creating a certificate, C3, for that non-migratable storage key.

In another alternative embodiment of step 202, the customer creates a non-migratable signing key, K2, with the TPM_CreateWrapKey command, wherein the key may be a 2048-bit RSA key. Signing keys can be used by the TPM to sign the hash of a message (i.e., encrypt the hash of a message). The customer decides if this signing key, K2, will require authorization or not, and what that authorization will be. The customer decides what parent will be used for storing this key (the SRK is available). The customer executes the TPM_CreateWrapKey command, with required parameters indicating the key, K2, will be a signing key. And then, the customer signs the non-migratable signing key, K2, with the TPM identity key, P2, creating a certificate, C4, for that key, K2.

In step 203, the customer contacts a credit card company over the Internet by browsing the credit card company's website. In step 204, the customer applies for a credit card authorization at the credit card company website by entering into a secure section of that website to fill out an application form. This implies a Secure Sockets Layer (SSL) to prove to the customer that the information he is giving the credit card company is not snoopable, and a certificate to prove to the customer he is indeed at the credit card company's web site. SSL is a means of creating encrypted communication between a user and a web site for entering a credit card without snoopers being able to access the number. The customer fills out the application form with his name, address and whatever other information the credit card company requires to determine whether the customer is credit worthy.

In step 205, under the first alternative embodiment described above where the customer creates a non-migratable storage key, K1, the customer will provide to the credit card company the non-migratable public portion of the storage key, K1, the certificate, C3, by the TPM identity that the RSA storage key is a non-migratable TPM key, the certificate, C2, from the CA that the TPM identity is indeed a TPM identity, and a pass phrase the customer would like to use for authorizing use of the requested credit card authorization. It is at this point that the credit card company can evaluate the requested pass phrase and turn it down if it appears to be too trivial.

If the customer had created a non-migratable signing key, K2, under the second alternative embodiment described above with respect to step 202, the customer will provide to credit card company in step 205 that non-migratable public portion of that signing key, K2, the certificate, C4, by the TPM identity that the signing key is a non-migratable TPM key, and the certificate, C2, from the CA that the TPM identity is indeed a TPM identity. In this embodiment, the pass phrase is chosen by the user, but is never provided to the credit card company.

In step 206, the credit card company determines the credit worthiness of the customer, and assuming the customer is credit worthy, the credit card company then checks the TPM identity certificate, C2, to see the level of security inherent in the TPM system to determine if that is sufficient to proceed. The credit card company may also check to see if the TPM identity certificate, C2, has been revoked by the CA that issued it.

In step 207, the credit card company creates a public/private key pair, P5, and a certificate, C5, to send to the customer. If the customer had previously sent a non-migratable storage key, K1, under the first alternative discussed above, then the credit card company will perform the following procedure. The credit card company will create the public/private key pair, P5, which may be a 2048-bit RSA key. If the credit card company wants to use a different kind of key, the TPM identity certificate, C2, will have to be checked to see if the TPM supports such a different kind of key. The credit card company will then create a header for the key, P5, using the format defined in the TCPA Specification, which is hereby incorporated by reference herein. In one alternative embodiment of this step, the header is created using the SHA-1 hash of the pass phrase selected by the customer, a migration pass phrase the credit card company generates, and creating a TCPA key bundle wrapping the key, P5, in the public key, K1, the customer gave the credit card company. In another alternative embodiment, the credit card company can create the header by using its own TCPA chip by commanding it to create a migratable key using the requisite pass phrases and choosing its own storage key (of any sort) for its own TPM, and then migrating that key to the customer's TPM public key, K1. If the credit card company performs this process, it must pass the end user the bundle and the random number that is used for this transition.

The credit card company then creates its own certificate, C5, for the public key, P5, it created. In one alternative embodiment of this substep, the credit card company mails (traditional mail services) a diskette with the bundle stored on it to the verified address of the customer. In another alternative embodiment of this subset, the credit card company emails or mails the bundle to the customer (thus allowing verification of address) and either mails the random number to the customer with the bundle, or mails the random number to the end user separately, or mails the end user a 1-800 telephone number to call in order to get the random number (thus allowing verification of telephone number).

If the customer had sent a non-migratable public portion of a signing key, K2, then the credit card company certifies the public key it has been sent and sends the certificate to the mailing address (proving verification of address) on a diskette. If the credit card company also wants to verify the telephone number, the certificate can be encrypted, for example X-ored with the SHA-1 hash of a pass phrase which is delivered over the phone.

At the end of this process, in step 208, the customer now has a private key pair which can only be used on the customer's computer system using a pass phrase the customer was allowed to choose, and which has a certificate of the credit card company. The credit card company can revoke the certificate whenever it wants.

An advantage of the first alternative described above where a non-migratable storage key is utilized, the credit card company can use the same key on multiple systems belonging to the customer, by simply re-wrapping the key with multiple storage keys of the customer. This is not possible with the second alternative where a signing key is created, unless the credit card company is willing to use migratable signing keys.

An advantage of the second alternative discussed above where the customer creates a non-migratable public portion of a signing key, the credit card company never receives the pass phrase from the customer used to authorize use of the key on the customer's system.

In an alternative embodiment of the present invention, a credit card company can perform a self-certification for a received non-migratable storage key. The customer of the system takes the certificate, C1, that was signed by the manufacturer of the system. This includes information regarding the security level the system was designed to as well as a certificate from the manufacturer of the TPM chip itself and a copy of P1, the endorsement public key from the TPM. The customer also asks the TPM (through a standard command) to generate a "TPM identity," a 2048-bit RSA signing key. The TPM returns the public portion of that key, P2. The customer takes P2 and the Certificate, C1, for the system and sends them to the credit card manufacturer. The credit card company verifies the certificate using the public keys of the manufacturer of both the TPM and the system and then provides a certificate, C6, for P2. However, the credit card company encrypts this certificate, C6, using P1 (as per the TCPA Specification). This encrypted certificate is sent back to the customer of the system. The customer sends the encrypted certificate, C6, to his TPM, (reloading the TPM identity key if necessary). The TPM checks the certificate against the identity key making certain that they match. If they do, the TPM exports enough information to decrypt the credit card company's certificate, C6, for that key.

The customer then requests his TPM to produce a non-migratable storage key (or non-migratable signing key depending on which alternative he is taking). The TPM returns the public portion of the key. The customer then requests the TPM to sign the public portion of the non-migratable key in the last step with his identity. The TPM does this, providing an identity certificate that it is a non-migratable (storage or signing) key. The customer then sends the public portion of the non-migratable key, its identity-based certificate, and the credit card company certificate, C6, for the identity, back to the credit card company, which can then use its own certification of the quality of the non-migratable key.

Although the present invention and its advantages have been described in detail, it should be understood that various changes, substitutions and alterations can be made herein without departing from the spirit and scope of the invention as defined by the appended claims.

What is claimed is:

1. A method comprising the steps of:
   receiving from a customer over a network an application for a credit card authorization, a non-migratable key, a first certificate by a Trusted Platform Module (TPM) identity associated with a computer system used by the customer, and a second certificate acquired by the computer system from a Certification Authority (CA);
   creating, by a processor, a public/private key pair and a third certificate in response to the receiving step; and
   sending the public/private key pair and the third certificate to the customer over the network.

2. The method as recited in claim 1, wherein after the sending step, the customer is capable of using the public/private key pair and the third certificate to make purchases over the network.

3. The method as recited in claim 1, wherein the TPM identity is a public/private key pair created as a result of a command by the customer input into the computer system.

4. The method as recited in claim 1, wherein the second certificate is created by the Certification Authority in response to receiving a third certificate signed by a manufacturer of the TPM and a public key of the TPM identity.

5. The method as recited in claim 4, wherein the third certificate is associated with an endorsement key of the TPM.

6. The method as recited in claim 1, wherein the network is the Internet.

7. A method comprising the steps of:
   creating a TPM identity at a customer's computer system;
   obtaining, at the customer's computer system, a first certificate from a first server supporting a CA over a network;
   creating, by a processor at the customer's computer system, a non-migratable key; and
   transferring a credit card authorization application, the TPM identity, the non-migratable key, and the first certificate from the customer's computer system to a second server supporting a credit card company.

8. The method as recited in claim 7, further comprising the steps of:
   the second server supporting the credit card company creating a public/private key pair and a second certificate in response to the transferring step; and
   transferring the public/private key pair and the second certificate from the second server supporting the credit card company to the customer's computer system.

9. The method as recited in claim 8, wherein the step of transferring the public/private key pair and the second certificate from the second server supporting the credit card company to the customer's computer system is performed using a traditional mail service.

10. The method as recited in claim 8, wherein the step of transferring the public/private key pair and the second certificate from the second server supporting the credit card company to the customer's computer system is performed using the network.

11. The method as recited in claim 8, further comprising the step of:
   a customer using the public/private key pair and the second certificate for commercial transactions over the network.

12. The method as recited in claim 11, wherein the network is the Internet.

13. The method as recited in claim 7 further comprising the step of:
   creating a public/private key pair.

14. The method as recited in claim 13, wherein the step of the customer's computer system obtaining the first certificate from the first server supporting the CA over the network further comprises the steps of:
   transferring from the customer's computer system to the first server supporting the CA a public portion of the public/private key pair created when the TPM identity is created and a third certificate associated with an endorsement key of the TPM;
   the CA checking an authenticity of the third certificate;
   the CA creating a fourth certificate for the TPM identity;
   the CA encrypting the fourth certificate;
   the CA bundling the encrypted fourth certificate with the public portion of the public/private key pair created when the TPM identity is created to create a first bundle; and
   the CA encrypting the first bundle with a public key of the third certificate to create a second bundle.

15. The method as recited in claim 14 further comprising the step of:

transferring the public/private key pair and a second certificate from the second server supporting the credit card company to the customer's computer system further comprises the steps of:
- the TPM decrypting the second bundle with a private portion of the third certificate producing the first bundle; and
- the TPM decrypting the first bundle with a private portion of the public/private key pair created when the TPM identity is created.

16. A computer program product embodied in a computer readable storage medium, comprising the program steps of:
- receiving from a customer over a network an application for a credit card authorization, a non-migratable key, a first certificate by a Trusted Platform Module (TPM) identity associated with a computer system used by the customer, and a second certificate acquired by the computer system from a Certification Authority (CA);
- creating a public/private key pair and a third certificate in response to the receiving step; and
- sending the public/private key pair and the third certificate to the customer over the network.

17. The computer program product as recited in claim 16, wherein after the sending step, the customer is capable of using the public/private key pair and the third certificate to make purchases over the network.

18. The computer program product as recited in claim 16, wherein the TPM identity is a public/private key pair created as a result of a command by the customer input into the computer system.

19. The computer program product as recited in claim 16, wherein the second certificate is created by the Certification Authority in response to receiving a third certificate signed by a manufacturer of the TPM and a public key of the TPM identity.

20. The computer program product as recited in claim 19, wherein the third certificate is associated with an endorsement key of the TPM.

21. A computer program product embodied in a computer readable storage medium, comprising the program steps of:
- creating a TPM identity;
- obtaining a first certificate from a CA;
- creating a non-migratable key;
- contacting a web site supporting a credit card company;
- sending to the web site an application for a credit card authorization, the TPM identity, the first certificate, and the non-migratable key; and
- receiving from the web site a public/private key pair and a second certificate enabling the credit card authorization.

22. The computer program product as recited in claim 21, further comprising the program step of:
- conducting a commercial transaction over the Internet using the credit card authorization as enabled by the public/private key pair and the second certificate.

23. The computer program product as recited in claim 21, wherein the non-migratable key is a signing key.

24. The computer program product as recited in claim 21, wherein the non-migratable key is a storage key.

25. A system comprising:
- a server supporting a web site of a credit card company;
- a customer computer including a TPM; and
- a network linked to the server and the customer computer;
- wherein the customer computer comprises a memory, wherein a first software is stored in the memory in the customer computer for requesting the TPM to create a TPM identity, wherein a second software is stored in the memory in the customer computer for obtaining a first certificate over the network from a CA, wherein a third software is stored in the memory in the customer computer for creating a non-migratable key, wherein a fourth software is stored in the memory in the customer computer for browsing the web site of the credit card company over the network, wherein a fifth software is stored in the memory in the customer computer for sending an application for a credit card authorization to the web site of the credit card company over the network, wherein a sixth software is stored in the memory in the customer computer for sending to the web site of the credit card company over the network the TPM identity, the first certificate, and the non-migratable key;
- wherein the web site of the credit card company creates a public/private key pair and a second certificate; and
- wherein the web site of the credit card company sends the public/private key pair and the second certificate over the network to the customer computer.

26. A system comprising:
- a memory, wherein code is stored in said memory;
- an adapter which communicates data to and receives data from a certificate server and a credit card application server;
- a Trusted Platform Module (TPM);
- a CPU, operatively coupled to said memory, said TPM, and said communications adapter, and which executes code stored in said memory;
- said CPU when executing said code effective in:
  - creating a TPM identity;
  - obtaining from said communications adapter a first certificate originating from said certificate server;
  - creating a non-migratable key; and
  - transferring a credit card authorization application, said TPM identity, said non-migratable key, and said first certificate to said credit card application server.

27. Apparatus comprising:
- an adapter through which data is exchanged with a certificate server and a credit card application server, a Trusted Platform Module (TPM) which creates a TPM identity;
- a CPU coupled to said adapter and to said TPM and effective in:
  (1) obtaining from said adapter a first certificate originating from the certificate server;
  (2) creating a non-migratable key and transferring said non-migratable key, said TPM identity, said first certificate, and a credit card authorization application to the credit card application server.

* * * * *